United States Patent
Lu

(10) Patent No.: US 10,040,001 B2
(45) Date of Patent: Aug. 7, 2018

(54) LIQUID COOLING DEVICE AND AIR COLLECTOR THEREOF

(71) Applicant: DELTA ELECTRONICS, INC., Taoyuan (TW)

(72) Inventor: Chao-Wen Lu, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 25 days.

(21) Appl. No.: 15/094,139

(22) Filed: Apr. 8, 2016

(65) Prior Publication Data

US 2017/0151511 A1 Jun. 1, 2017

(30) Foreign Application Priority Data

Nov. 27, 2015 (TW) .............................. 104219082 U

(51) Int. Cl.
| | |
|---|---|
| *F28F 7/00* | (2006.01) |
| *B01D 19/00* | (2006.01) |
| *F28D 15/00* | (2006.01) |
| *F28D 21/00* | (2006.01) |

(52) U.S. Cl.
CPC ......... *B01D 19/0042* (2013.01); *F28D 15/00* (2013.01); *F28D 2021/0028* (2013.01); *F28F 2250/08* (2013.01); *F28F 2265/18* (2013.01)

(58) Field of Classification Search
CPC .................. B01D 19/0042; F28D 15/00; F28D 2021/0028; F28D 1/06; F28D 1/0477; F28F 2250/08; F28F 2265/18

USPC ......................................................... 165/80.4
See application file for complete search history.

(56) References Cited

U.S. PATENT DOCUMENTS

| | | | |
|---|---|---|---|
| 2,370,390 A * | 2/1945 | Berryman ................. | F28D 1/06 137/592 |
| 2004/0001312 A1 * | 1/2004 | Hotta ........................ | G06F 1/20 361/679.47 |
| 2004/0109290 A1 * | 6/2004 | Dunn ................... | H01L 23/4332 361/699 |
| 2006/0037739 A1 * | 2/2006 | Utsunomiya ........... | G06F 1/203 165/104.33 |
| 2007/0068653 A1 * | 3/2007 | Kondou ................ | F28D 1/0477 165/80.4 |

* cited by examiner

*Primary Examiner* — Davis Hwu
(74) *Attorney, Agent, or Firm* — Muncy, Geissler, Olds & Lowe, P.C.

(57) ABSTRACT

A liquid-cooling device and an air collector thereof are provided. The air collector includes a tank, an inlet channel, an outlet channel, and a barrier plate. The inlet channel is located at one end of the tank and extended into the tank. The outlet channel is located at the other end of the tank and extended into the tank. The barrier plate is located in the tank between the inlet channel and the outlet channel. The diameter of the tank is greater than those of the inlet channel and the outlet channel.

9 Claims, 3 Drawing Sheets

LIQUID COOLING DEVICE AND AIR COLLECTOR THEREOF

CROSS REFERENCE TO RELATED APPLICATIONS

This Non-provisional application claims priority under 35 U.S.C. § 119(a) on Patent Application No(s). 104219082 filed in Taiwan, Republic of China on Nov. 27, 2015, the entire contents of which are hereby incorporated by reference.

BACKGROUND OF THE INVENTION

Field of Invention

The invention relates to a liquid-cooling device and an air collector thereof, and in particular to an air collector applied to the liquid-cooling heat dissipation device.

Related Art

Nowadays, in cars, refrigerators, personal computers, or various electronic apparatus, excessive heat occurs when engines, motors, central processors and the like are operating. Without effective dissipation, the heat gradually accumulates so the excessive heat causes worse performances of the processor or other important components and even damages these devices. Therefore, these apparatus are equipped with heat dissipation devices for dissipating the heat generated during the operation of the elements so as to improve the overall operation efficiency of the apparatus or the equipment. It is important for the heat dissipation device to have better heat dissipation capability.

Generally, heat dissipation methods for heat dissipation devices are mainly classified into two categories: air-cooling heat dissipation and water-cooling heat dissipation. Water has about 26 times thermal conductivity of air, so the water-cooling heat dissipation has better heat dissipation capability compared with the air-cooling heat dissipation. For better heat dissipation, it is preferable for the water-cooling heat dissipation device that there is only liquid in the pipes of the device but no air. After prolonged use, it is still possible that external air enters the pipes. The air entering the pipes reduces the overall thermal conductivity of the cooling water in the pipes. Therefore, the water-cooling heat dissipation device (liquid-cooling device) preferably has an air collection device, for example an air collector, to collect the air within the pipes so as to maintain the heat dissipation performance of the liquid-cooling device.

Therefore, it is needed to provide a simple and effective liquid-cooling device and an air collector thereof which can keep the pipes of the liquid-cooling device containing only liquid by effectively collecting the air within the pipes of the liquid-cooling device to avoid the reduction of the heat dissipation efficiency caused by the air within the pipes and further improve the heat dissipation efficiency of the liquid-cooling device.

SUMMARY OF THE INVENTION

An aspect of the disclosure is to provide a simple and effective liquid-cooling device and an air collector thereof which can keep the pipes of the liquid-cooling device containing only liquid by collecting the air within the pipes of the liquid-cooling device to avoid the reduction of the heat dissipation efficiency caused by the air within the pipes and further improve the heat dissipation efficiency of the liquid-cooling device.

An air collector according to the disclosure includes a tank, an inlet channel, an outlet channel, and a barrier plate. The inlet channel is located at one end of the tank and extended into the tank. The outlet channel is located at the other end of the tank and extended into the tank. The barrier plate is located in the tank between the inlet channel and the outlet channel. The diameter of the tank is greater than those of the inlet channel and the outlet channel.

In one embodiment, at least one part of the periphery of the barrier plate is connected to an inner wall of the tank.

In one embodiment, the whole periphery of the barrier plate is connected to the inner wall of the tank, and the barrier plate has at least an opening.

In one embodiment, the barrier plate and the inner wall of the tank have an included angle, and the included angle is a right angle, acute angle, or obtuse angle.

In one embodiment, the barrier plate is in a flat-plate shape, a wavy shape, a bending shape, or a combination thereof.

In one embodiment, the inlet channel and the outlet channel are aligned or misaligned.

In one embodiment, the tank is a rigid body whose material includes metal, plastic, or a multilayer structure of combination thereof.

In one embodiment, the tank is an elastomer whose material includes silica gel or rubber.

A liquid-cooling device according to the disclosure includes a body, a first pipe, a second pipe, and an air collector. The air collector includes a tank, an inlet channel, an outlet channel, and a barrier plate. The inlet channel is located at one end of the tank and extended into the tank, and the outlet channel is located at the other end of the tank and extended into the tank. One end of the first pipe and that of the second pipe are respectively attached to the inlet and the outlet of the body. The other end of first pipe and that of the second pipe are respectively attached to the outlet channel and the inlet channel of the tank. The barrier plate is located in the tank between the inlet channel and the outlet channel, and the diameter of the tank is greater than those of the inlet channel and the outlet channel.

In one embodiment, the body further includes a pump, and the pump pressurizes a liquid within the body to drive the liquid to flow through the body, the second pipe, the air collector, and the first pipe.

In one embodiment, at least one part of the periphery of the barrier plate is connected to an inner wall of the tank.

In one embodiment, the whole periphery of the barrier plate is connected to the inner wall of the tank, and the barrier plate has at least an opening.

In one embodiment, the barrier plate and the inner wall of the tank have an included angle, and the included angle is a right angle, acute angle, or obtuse angle.

In one embodiment, the barrier plate is in a flat-plate shape, a wavy shape, a bending shape, or a combination thereof.

In one embodiment, the inlet channel and the outlet channel are aligned or misaligned.

In one embodiment, the tank is a rigid body whose material includes metal, plastic, or a multilayer structure of combination thereof.

In one embodiment, the tank is an elastomer whose material includes silica gel or rubber.

As mentioned above, the air collector of the liquid-cooling device according to the disclosure can effectively collect air in the pipes of the liquid-cooling device. When air enters the air collector, the air along the barrier plate stays in the air collection space formed between the tank and the portions of the inlet channel and the outlet channel which are extended into the tank, and the air is also prevented from flowing out from the outlet channel. Accordingly, air is collected and air in the pipes is reduced. Moreover, because the tank itself may rotate at any angle, the air collector can prevent air from entering the outlet channel regardless of any movement or displacement of the air collector caused by the external environment to maintain the function of air collection. Therefore, it may be applied to the liquid-cooling devices of various equipment, for example the liquid-cooling device of portable electronic apparatus.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The embodiments of the invention will be apparent from the following detailed description, which proceeds with reference to the accompanying drawings, wherein the same references relate to the same elements. Moreover, the drawings of all implementation are schematic, and they do not mean the actual size and proportion.

The terms of direction recited in the disclosure, for example up, down, left, right, front, or rear, only define the directions according to the accompanying drawings for the convenience of explanation but not for limitation.

The names of elements and the wording recited in the disclosure all have ordinary meanings in the art unless otherwise stated. Therefore, a person skilled in the art can unambiguously understand their meanings.

Figure 1:
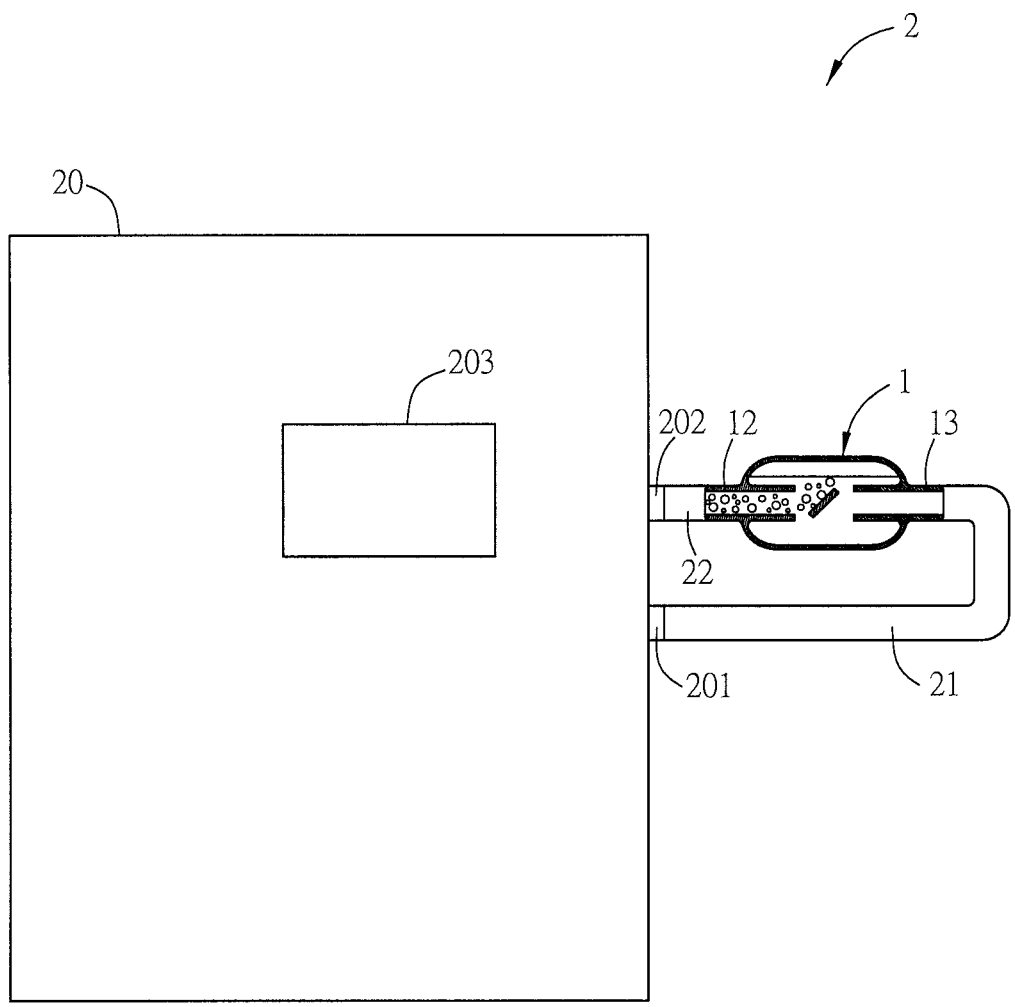
FIG. 1 is a schematic diagram showing the application of the air collector according to the disclosure to the liquid-cooling device.
Figure 2:
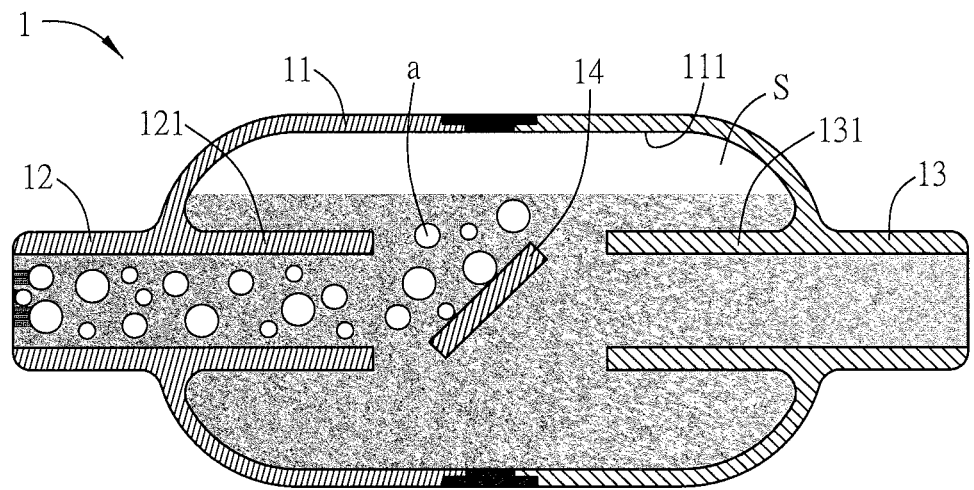
FIG. 2 is a schematic diagram showing the air collector according to the disclosure.

Referring to FIG. 1 and FIG. 2, FIG. 1 is a schematic diagram showing the application of the air collector of the disclosure to the liquid-cooling device, and FIG. 2 is a schematic diagram showing the air collector of the disclosure. The liquid-cooling device 2 according to the disclosure includes a body 20, a first pipe 21, a second pipe 22, and an air collector 1. The body 20 has an inlet 201 and an outlet 202, and a pump 203 is disposed in the body 20. The pump 203 may pressurize a liquid within the body 20 to drive the liquid to flow through the body 20, the second pipe 22, the air collector 1, and the first pipe 21 so as to form a close flow path.

The air collector 1 according to the disclosure includes a tank 11, an inlet channel 12, an outlet channel 13, and a barrier plate 14. One end of the first pipe 21 and that of the second pipe 22 are respectively attached to the inlet 201 and the outlet 202 of the body 20, and the other end of the first pipe 21 and that of the second pipe 22 are respectively attached to the outlet channel 13 and the inlet channel 12 of the air collector 1. Moreover, the inlet channel 12 is located at one end of the tank 11 and extended into the tank 11. The outlet channel 13 is located at the other end of the tank 11 and also extended into the tank 11 like the inlet channel 12. The barrier plate 14 is located in the tank 11 between the inlet channel 12 and the outlet channel 13. The diameter of the tank 11 is greater than those of the inlet channel 12 and the outlet channel 13. The inlet channel 12 and the outlet channel 13 may be located at two opposite ends of the tank 11 or located at two adjacent ends of the tank 11, and their locations are not limited thereto. In addition, the inlet channel 12 in axial alignment with the outlet channel 13 is illustrated for example in the figure. However, the inlet channel 12 and the outlet channel 13 may not be axially aligned (misalignment shown in FIG. 4B), either.

In detail, the inlet channel 12 is locate at one of the two ends of the tank 11 in the long-axis direction, and the outlet channel 13 is located at the other end. A portion 121 of the inlet channel 12 and a portion 131 of the outlet channel 13 are further extended into the tank 11. As shown in FIG. 2, the long tubular inlet channel 12 and outlet channel 13 are respectively inserted into the tank 11 at the two ends of the tank 11 in the long-axis direction to form the air collector 1. Then, the barrier plate 14 is located between the inlet channel 12 and the outlet channel 13. Namely, the barrier plate 14 is located in the tank 11 between the portion 121 of the inlet channel 12 and the portion 131 of the outlet channel 13. Moreover, the size (i.e. diameter) of the tank 11 is greater than the diameters of the inlet channel 12 and the outlet channel 13, and thus an air collection space S is formed in the tank 11.

It should be noted that the structural connection between the barrier plate 14 and the air collector 1 shown in FIG. 2 is just schematic for the convenience of explanation. The actual connection will be illustrated in detail in the following drawings and paragraphs.

By the above mentioned structure, when air a flows into the air collector 1 via the inlet channel 12, the air a flows into the tank 11 along the portion 121 of the inlet channel 12 first. After touching the barrier plate 14, the air a flows toward the air collection space S above the tank 11 along the barrier plate 14 and then stays in the air collection space S instead of flowing out of the tank 11 through the portion 131 of the outlet channel 13. As a result, the air collector 1 collects the air a and reduces the air in the pipes of the liquid-cooling device. The air collection space S means the space which is formed between the inner wall 111 of the tank 11, the portion 121 of the inlet channel 12 which is extended into the tank 11, and the portion 131 of the outlet channel 13 which is extended into the tank 11. Moreover, because an air collection space S (i.e. volume for collecting air) is necessary for collecting air a in the tank 11, the tank 11 is not fully filled with liquid and an air collection space S needs reserving for collecting air.

For example, the tank 11 may rotate or flip at any angle. Regardless of any movement or displacement of the air collector 1 caused by the external environment, air a still similarly flows into the tank 11 along the inlet channel 12 and then is isolated into the air collection space S by the barrier plate 14. Therefore, the air collector 1 can be applied to mobile liquid-cooling devices, for example the liquid-cooling device of portable electronic apparatus. Moreover, the tank 11 of the air collector 1 is, for example but not limited to, a rigid body or an elastomer. If it is a rigid body, its material includes metal, plastic, or a multilayer structure of combination thereof. If it is an elastomer, its material includes silica gel, rubber, or the like.

Figure 3:
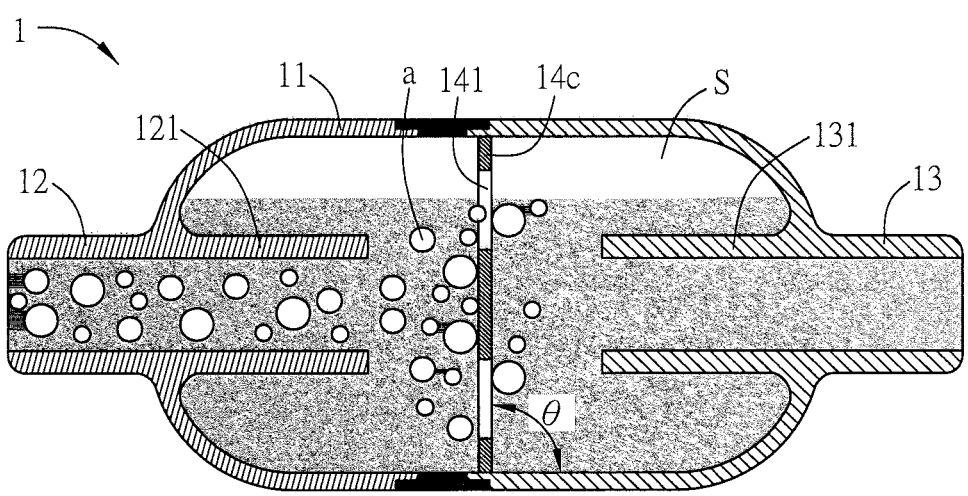
FIG. 3 is a schematic diagram showing the air collector according to another embodiment of the disclosure.

Then, the arrangement of the barrier plate 14 in the air collector 1 is further illustrated. Referring to FIG. 3, it is a schematic diagram showing the air collector of the liquid-cooling device according to another embodiment of the disclosure. It should be noted that the barrier plate 14 drawn in FIG. 2 is just schematic for illustrating the overall structure of the air collector 1, and the detailed arrangement is shown in FIG. 3.

As shown in FIG. 3, the whole periphery of the barrier plate 14c is connected to the inner wall 111 of the tank 11. In this case, the barrier plate 14c has at least an opening 141 for allowing air a to flow through. The above mentioned connection may be made by, for example but not limited to, integrally molding, bonding, engagement, or the like.

Referring to FIG. 3, the barrier plate 14c and the inner wall 111 of the tank 11 has an included angle θ, and the included angle θ may be a right angle, acute angle, or obtuse angle. In detail, the included angle θ indicates an included angle between the barrier plate 14 and the inner wall 111. For example, the included angle θ is a right angle of 90 degrees in FIG. 3. It should be noted that the arrangement and the magnitude of the included angle drawn in FIG. 3 is just for illustration but not for limiting the disclosure. In practice, they may be varied depending on the specification of the liquid-cooling device or the electronic device product which the air collector 1 is applied to.

Figure 4A:
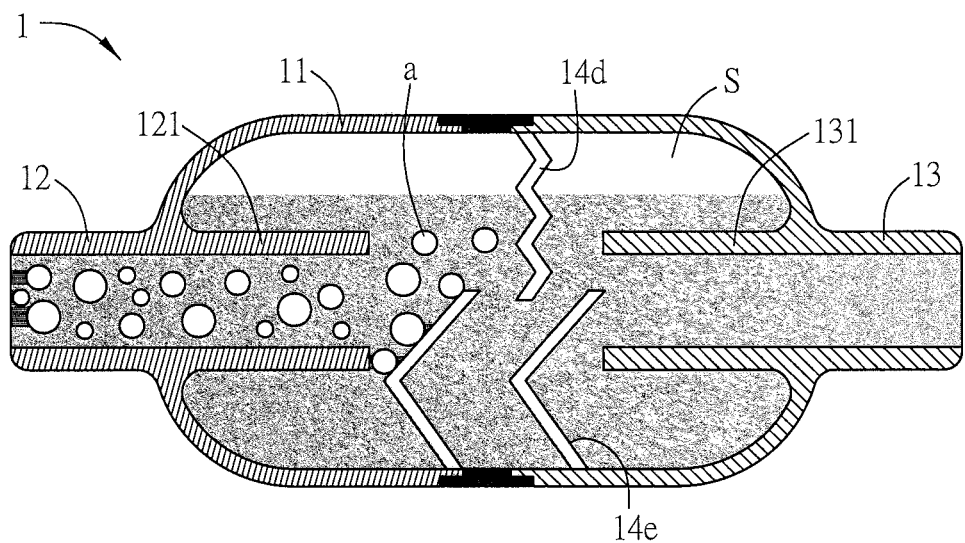
FIG. 4A to FIG. 4B are schematic diagrams showing the air collector according to another embodiment of the disclosure.
Figure 4B:
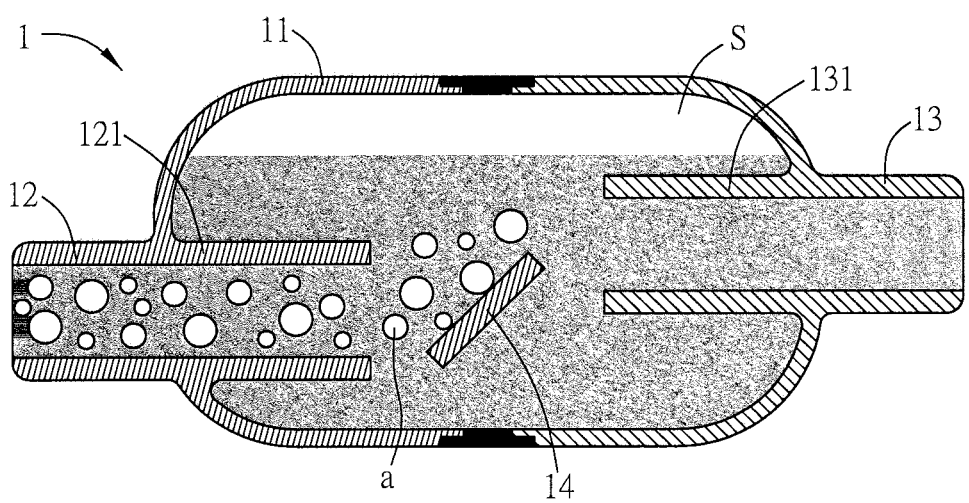

Referring to FIG. 4A to FIG. 4B, they are schematic diagrams showing the air collector of the liquid-cooling device according to another embodiment of the disclosure. As to the shape of the barrier plate 14, in addition to the flat-plate shape shown in FIG. 2 and FIG. 3, it may also be a combination of the wavy shape and the bending shape like the barrier plates 14d, 14e shown in FIG. 4A. Then, regarding to the locations of the inlet channel 12 and the outlet channel 13, referring to FIG. 4B, the locations are aligned in FIG. 2, FIG. 3 and FIG. 4A, but they may also be misaligned as shown in FIG. 4B.

The above mentioned aspects of the drawings are used for illustration only but not for limitation. In the disclosure, the number of the barrier plate 14, the included angle between the tank 11 and the barrier plate 14, and the arrangement of the inlet channel 12 and the outlet channel 13 all may be varied depending on the specification of the liquid-cooling device or the electronic device product which the air collector 1 is applied to. For example, the wavy barrier plate 14d is arranged with the misaligned inlet channel 12 and outlet channel 13, and the tank 11 and the barrier plate 14 have the included angle θ which is a right angle. For example, the bending-shaped barrier plate 14e is arranged with the misaligned inlet channel 12 and outlet channel 13, and the tank 11 and the barrier plate 14 have the included angle which is an acute angle. Moreover, it should be noted that, similar to FIG. 2, the barrier plates 14 drawn in FIG. 4A and FIG. 4B is just schematic, and the detailed arrangement is shown in FIG. 3.

In summary, the air collector of the liquid-cooling device according to the disclosure can effectively collect air in the pipes of the liquid-cooling device. When air enters the air collector, the air along the barrier plate stays in the air collection space formed between the tank and the portions of the inlet channel and the outlet channel which are extended into the tank, and the air is also prevented from flowing out from the outlet channel. Accordingly, air is collected and air in the pipes is reduced. Moreover, because the tank itself may rotate at any angle, the air collector can prevent air from entering the outlet channel regardless of any movement or displacement of the air collector caused by the external environment to maintain the function of air collection. Therefore, it may be applied to the liquid-cooling devices of various equipment, for example the liquid-cooling device of portable electronic apparatus.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A liquid-cooling device, comprising:
   a body having an inlet and an outlet;
   a first pipe whose one end is attached to the inlet;
   a second pipe whose one end is attached to the outlet; and
   an air collector, comprising:
      a tank;
      an inlet channel located at one end of the tank and extended into the tank, wherein the inlet channel is attached to the other end of the second pipe;
      an outlet channel located at the other end of the tank and extended into the tank, wherein the outlet channel is attached to the other end of the first pipe; and
      a barrier plate located in the tank between the inlet channel and the outlet channel;
      wherein the diameter of the tank is greater than those of the inlet channel and the outlet channel.

2. The liquid-cooling device of claim 1, wherein the body further comprises a pump, and the pump pressurizes a liquid within the body to drive the liquid to flow through the body, the second pipe, the air collector, and the first pipe.

3. The liquid-cooling device of claim 1, wherein at least one part of the periphery of the barrier plate is connected to an inner wall of the tank.

4. The liquid-cooling device of claim 3, wherein the whole periphery of the barrier plate is connected to the inner wall of the tank, and the barrier plate has at least an opening.

5. The liquid-cooling device of claim 3, wherein the barrier plate and the inner wall of the tank have an included angle, and the included angle is a right angle, acute angle, or obtuse angle.

6. The liquid-cooling device of claim 1, wherein the barrier plate is in a flat-plate shape, a wavy shape, a bending shape, or a combination thereof.

7. The liquid-cooling device of claim 1, wherein the inlet channel and the outlet channel are aligned or misaligned.

8. The liquid-cooling device of claim 1, wherein the tank is a rigid body whose material includes metal, plastic, or a multilayer structure of combination thereof.

9. The liquid-cooling device of claim 1, wherein the tank is a elastomer whose material includes silica gel or rubber.

* * * * *